United States Patent [19]

Skanes et al.

[11] 3,725,996
[45] Apr. 10, 1973

[54] PROCESS OF MANUFACTURING FIRST AND SECOND TRACTOR VEHICLES FOR DIFFERENT WORK IN THE FIELD

[75] Inventors: Frederick A. Skanes, Burlington; Roy O. Ayranto, Grimsby; Ronald G. Kraemer, Mitchell, all of Calif.

[73] Assignee: International Harvester Company, Chicago, Ill.

[22] Filed: Sept. 11, 1969

[21] Appl. No.: 857,109

[52] U.S. Cl. .................29/428, 296/35 A, 296/1 R
[51] Int. Cl. ..............................................B23p 19/00
[58] Field of Search..........................29/428; 296/1 R, 296/10, 35, 35.1, 35 A; 180/9.62, 9.2; 214/131, 144, 133

[56] References Cited

UNITED STATES PATENTS

| | | | |
|---|---|---|---|
| 1,242,446 | 10/1917 | Johnson | 296/35.1 |
| 1,222,868 | 4/1917 | Holland | 296/35.1 |
| 3,037,807 | 6/1962 | Hicks | 296/10 |
| 3,266,836 | 8/1966 | Taylor | 296/10 |
| 3,338,617 | 8/1967 | Lockwood | 296/1 |
| 3,390,913 | 7/1968 | Hunter | 296/10 |
| 2,717,090 | 9/1955 | Malo | 214/131 |
| 2,914,201 | 11/1959 | Krieger | 214/131 |
| 3,047,170 | 7/1962 | Hough | 214/131 |

Primary Examiner—John F. Campbell
Assistant Examiner—Donald P. Rooney
Attorney—Floyd B. Harman

[57] ABSTRACT

Crawler dozer and crawler loader having a common design in which the same basic upright frame in the center serves as the implement-linkage mounting structure and, at the same time, forms an integral part of the crawler tractor body. The frame is an A-frame disposed in a transverse vertical plane. It has two double walled legs in the case of the loader and, in either case, has side plates forming those two legs of the frame and clamped at four points on front and rear tractor gage bars by individual, longitudinally and transversely spaced apart, clamping joints.

1 Claim, 7 Drawing Figures

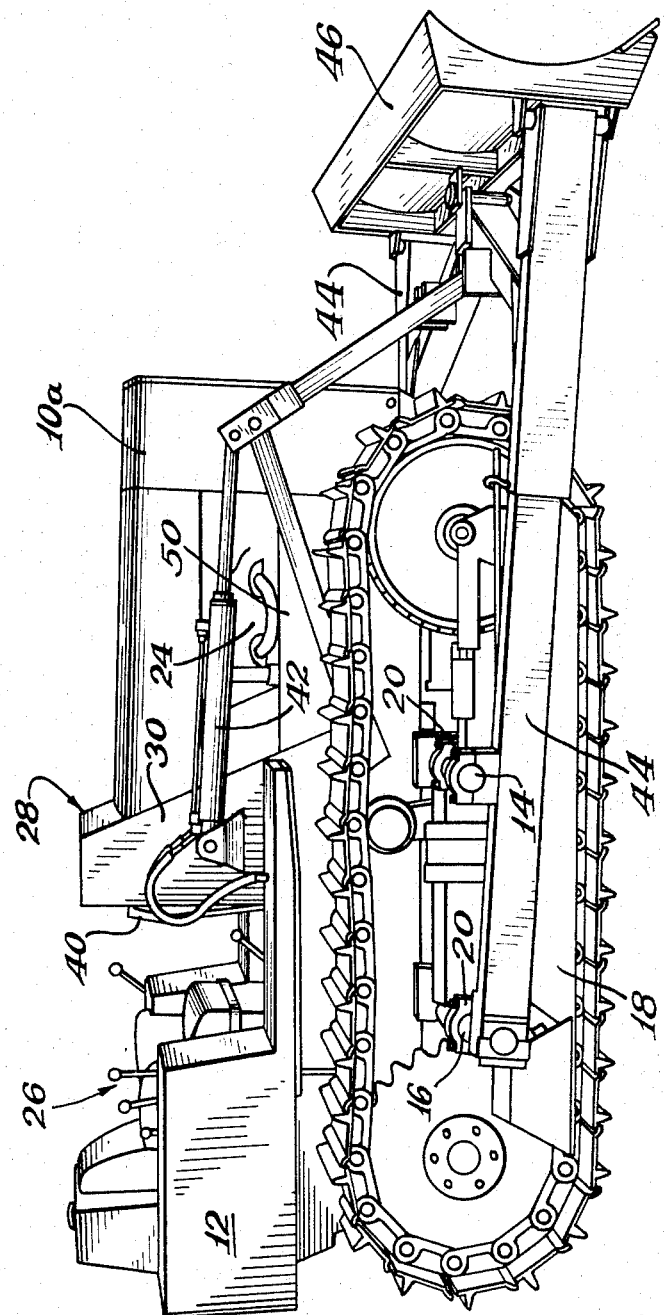

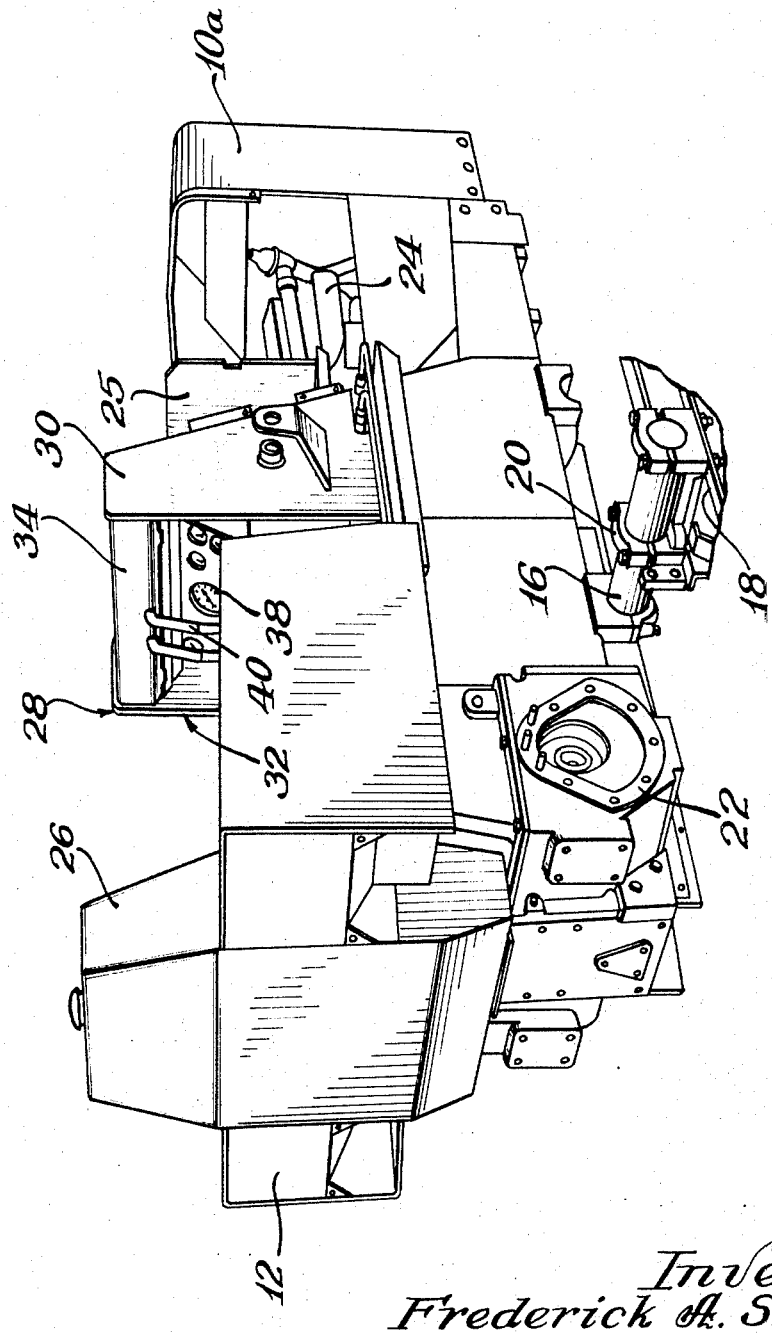

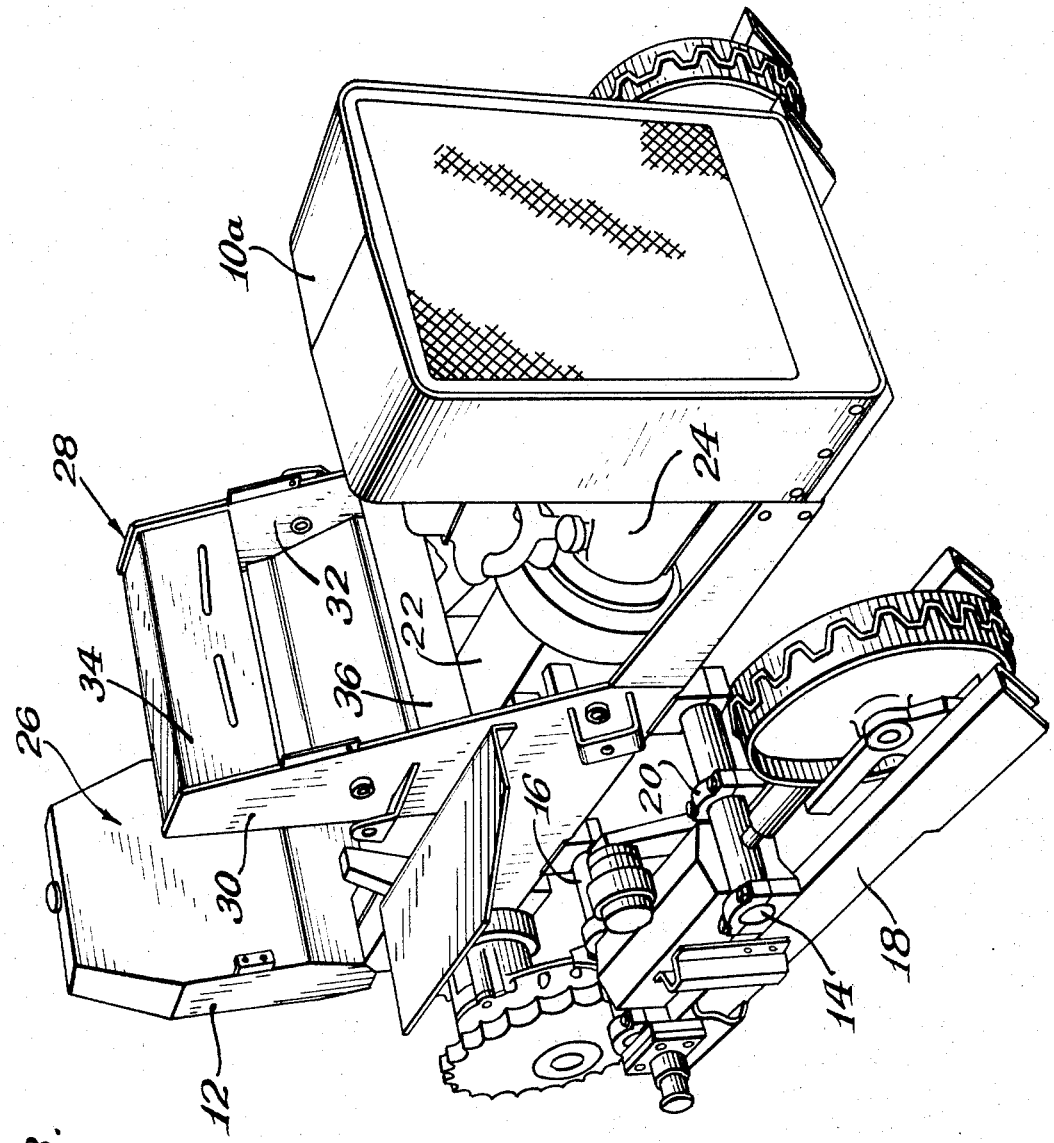

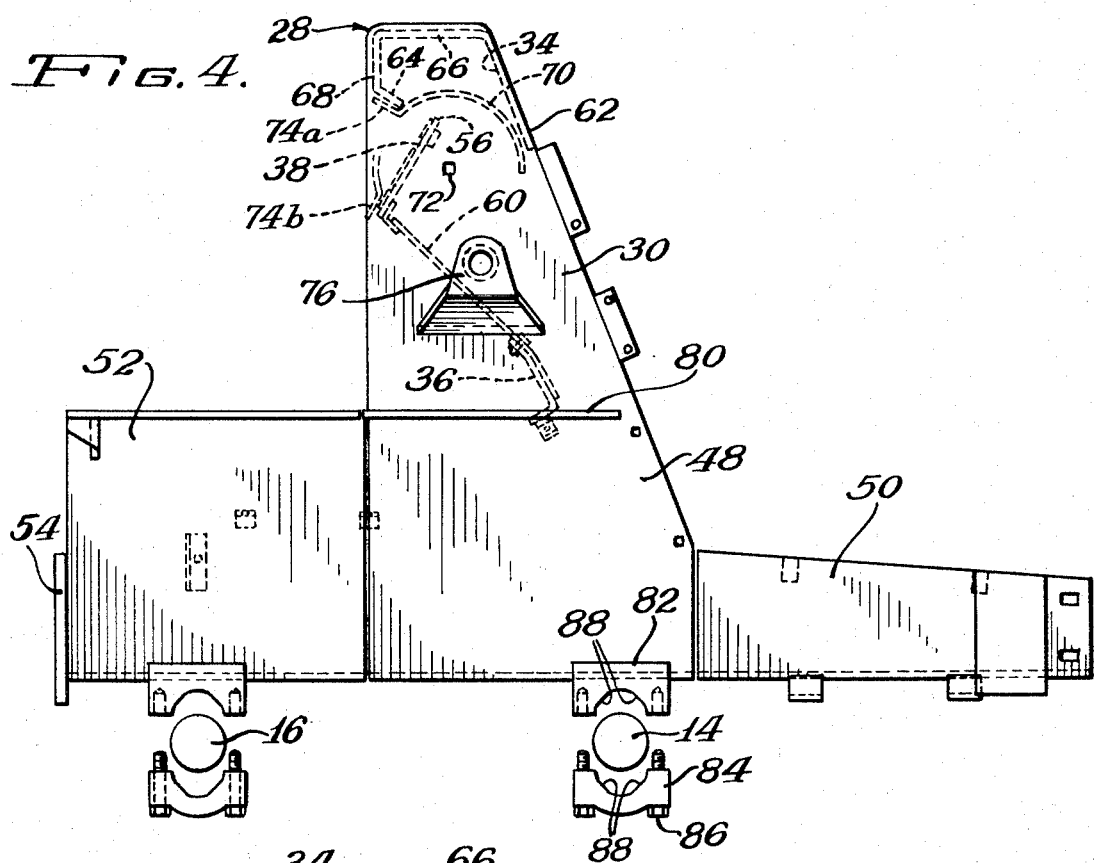
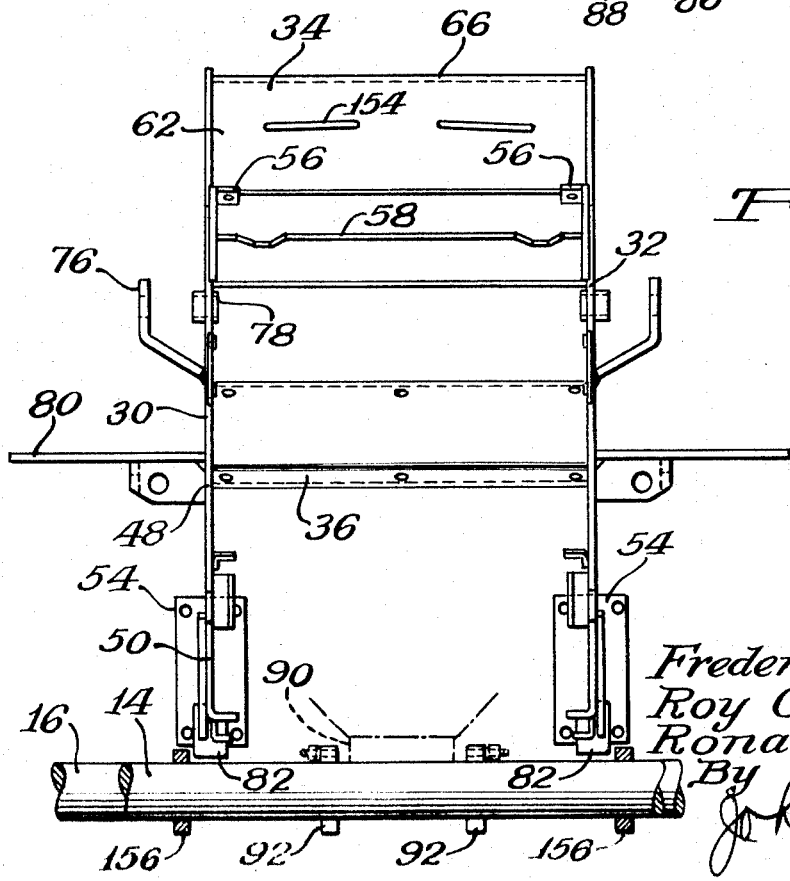

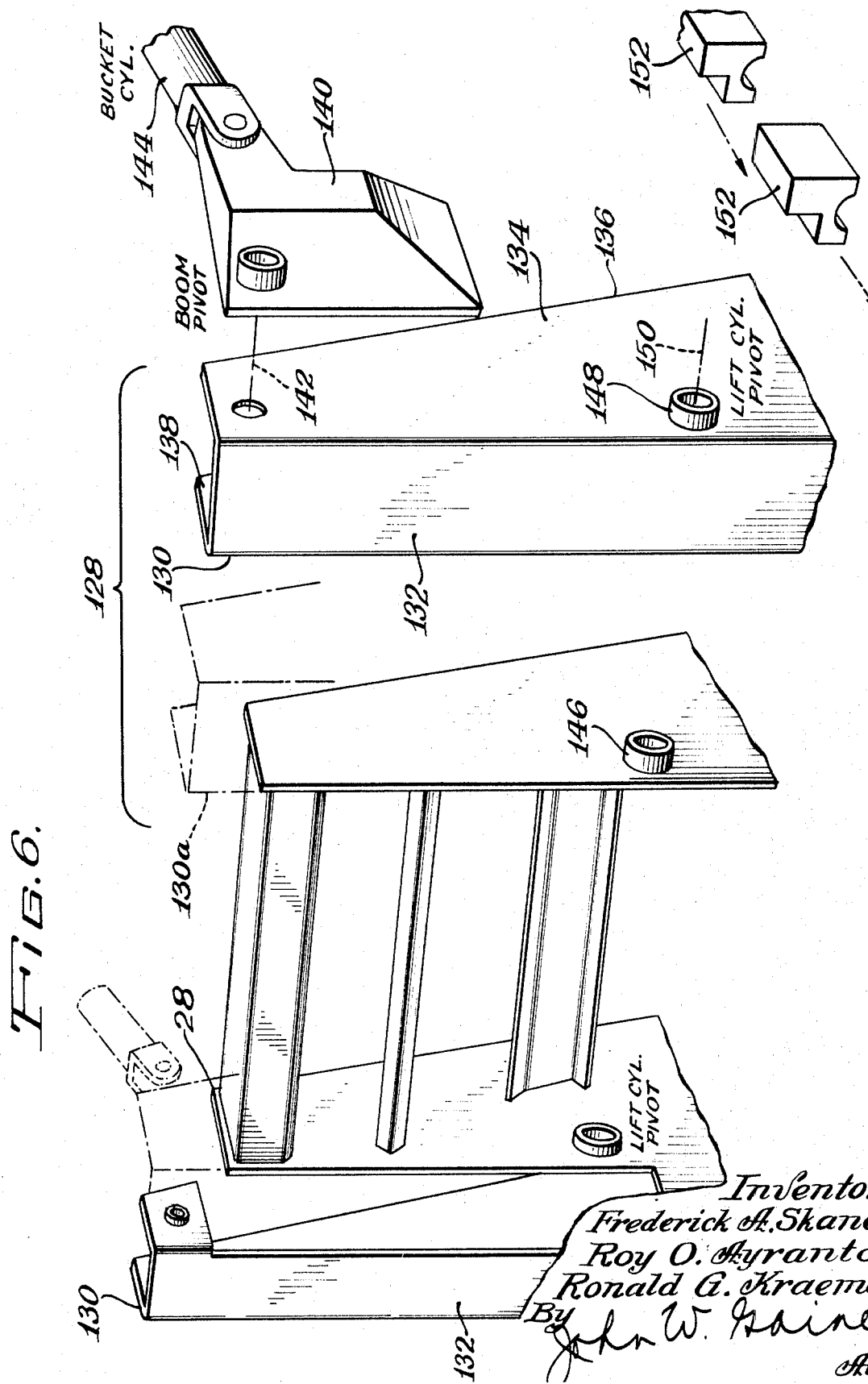

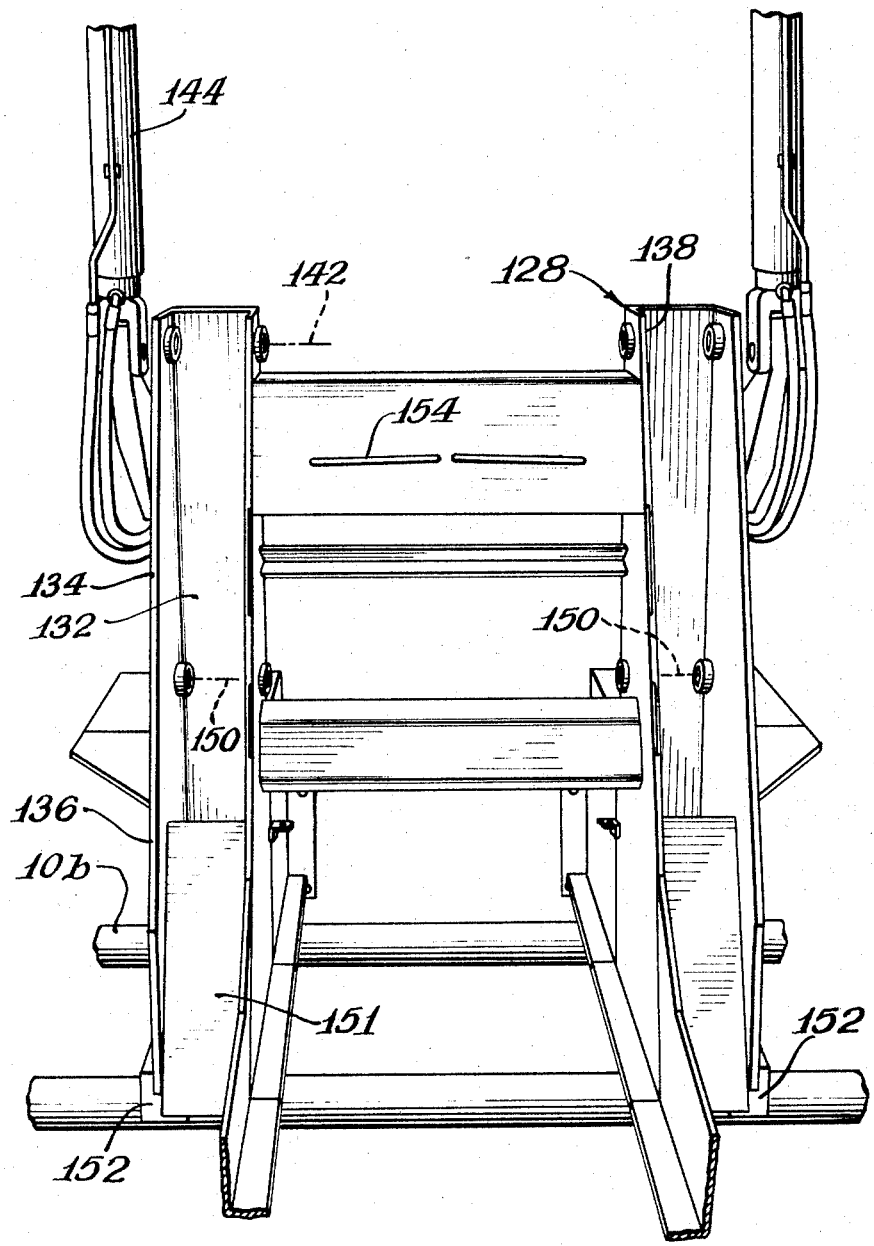

PROCESS OF MANUFACTURING FIRST AND SECOND TRACTOR VEHICLES FOR DIFFERENT WORK IN THE FIELD

This application relates to a crawler tractor body having, transversely disposed at the center thereof, an integral upright A-frame of one of two types. One type forms the implement linkage mounting structure for dozer blade linkage, one forms a similar but stronger mounting structure for loader bucket linkage, and the same basic tractor body design serves for either crawler, be it in the loader or the dozer.

Crawler dozers and crawler loaders, when made according to practice in the past to have about the same size and horsepower, have had separate designs for the upright frame in the center of the body serving as the implement linkage mounting structure. Of the two, the loader linkage of the crawler loader has been the heavier, characterized by a mounting tower including a very sturdy pair of upright posts on opposite sides of the tractor body.

It has therefore been the practice, in cases such as illustrated by expired U.S. Pat. No. 2,526,500, to utilize a bare or stripped down crawler for loader work by super-imposing on the bare crawler an external and often bulky framework which could be installed new or else readily retrofitted thereto. An altogether different external and often bulky framework was fitted to the bare crawler in order to provide a dozer attachment for the crawler.

The difficulty has been a lack of commonality of parts and the failure of the framework for the attachments to be an integral part of the tractor.

Or, as it has sometimes occurred, a crawler loader and a crawler dozer from the same manufacturer, and having about the same horsepower, have been designed and manufactured practically as two separate machines. The latter occurrence with loaders and dozers of the same size and horsepower has come about with manufacturers who have sought to avoid the attachment difficulty by building-in the mounting frames, one for one of the uses and an altogether different one for the other use. In so doing, such manufacturers have experienced the difficulty of an even greater lack of commonality of parts.

Our invention substantially eliminates or materially reduces the foregoing difficulties with the provision of the same basic upright frame in the center of the tractor body, which serves as the implement linkage mounting structure therefor and at the same time forms an integral part of the crawler tractor, as will now be described in detail in connection with a common dozer-loader design.

Various features, objects, and advantages will either be specifically pointed our or become apparent when, for a better understanding of our invention, reference is made to the following description which descloses certain preferred embodiments thereof and in which:

FIG. 1 is a right side elevational view, in perspective, of a crawler tractor with the body embodying the present invention for dozer work;

FIG. 2 is a perspective view from the right rear, with various parts removed or broken away for clarity;

FIG. 3 is similar to FIG. 2 but with the view from the right front;

FIGS. 4 and 5 are right side-elevational and front-elevational views of the upright, implement linkage mounting frame (for dozer work) in the center of the body; and FIGS. 6 and 7 are right side (exploded) and front views, in elevation and in perspective, of the invention modified for loader work.

More particularly as shown in FIGS. 1, 2, and 3 of the drawings, a crawler tractor 10a has a generally longitudinally extending body 12 provided with a set of fixed spaced-apart straight front and rear gage bars 14 and 16. At each side of the body, a portion of each of the front and rear gage bars projects transversely in a horizontal plane common to the other portion for supporting the body at that side and the portions are supported on supporting means. More specifically, the gage bar portions at each side and a conventional crawler track frame 18 at that side have interconnecting clamps 20 rigidly securing them together at points on the gage bar keeping the planes of the track frames parallel to one another and to the vertical plane through the longitudinal axis of the crawler.

The gage bars 14 and 16 are connected to a centrally longitudinally disposed main frame 22 and the bars support the main frame at points midway between the ends of the bars.

A forwardly mounted engine 24 in the body 12 occupies a front compartment having a transversely disposed fire wall 25 (FIG. 2) at the rear of the compartment. An operator's compartment 26 in the body 12 has a forwardly facing rear seat mounted at the rear of the tractor.

The body 12 further includes an integrated, implement linkage mounting, upright basic A-frame 28 disposed generally in a transverse vertical plane. The A-frame 28 has side plates 30 and 32 in transversely spaced apart longitudinally extending vertical planes, and respective upper and intermediate crossmembers 34 and 36 (FIG. 3) bridging rigidly between and interconnecting the respective side plates 30 and 32.

The operator views the vehicle from behind a rearwardly facing instrument panel 38 (FIG. 2) which is mounted diagonally transversely in the A-frame 28 and he controls the operation by conventional controls including left and right steering levers 40 which are upstanding ahead of where the operator is seated in the compartment 26.

The upstanding A-frame 28 in its basic form adapts the crawler for dozer work, pivotally accepting the boom or lift cylinders 42 (FIG. 1) of a dozer linkage. The dozer linkage has a pair of track-frame-connected booms or push arms 44 in a C-frame on which a dozer blade 46 is transversely mounted in a vertical plane on a vertical pivot carried by the C-frame.

A-FRAME 28—FIGS. 4 and 5

The basic A-frame 28 is symmetrical (FIG. 5) and the side plate 30 forming the leg of the frame at one side is typical of the plate 32 at the other side. A tower section 48 of the plate 30 located at the center is in the transverse vertical plane containing the upper and intermediate crossmembers 34 and 36. A welded-on front extension 50 of the tower section forms the lower section of one side of the front compartment in which the engine 24, not shown, is mounted. A rear extension 52 is welded to the tower section 48 and carries, among other things, a transversely disposed mounting plate 54 for attachment to the main frame, not shown.

Both the upward spacing of the upper crossmember 34 and the downward spacing of the intermediate crossmember 36 from the instrument panel 38 in the A-frame 28 prevent the instrument panel 38 from being loaded as a structural member. The instrument panel 38 is therefore isolated in the frame from providing a stress path and hence the panel does not appreciably distort. The panel 38 (FIG. 4) is secured at its upper front end to drilled and tapped attachment brackets 56 secured one to each side plate, and the panel 38 is secured at its lower rear end to a small crossmember 58 (FIG. 5) of angle section which bridges between and is welded at opposite ends to the side plates. A thin rectangular metal sheet 60 (FIG. 4) closes off and diagonally bridges across the space between the angle section crossmember 58 and the intermediate crossmember 38 and is suitably bolted to both.

The upper crossmember 34 is formed metal of generally inverted J-shape in cross section including a downwardly and forwardly directed long leg 62, a similarly directed opposing short leg 64, and integrally joined, respectively horizontal and vertical interconnecting web portions 66 and 68.

A semicylindrical guard 70 is mounted by suitable connections, not shown, in the A-frame 28 to pivot about a horizontal axis 72 between two positions. One is an unused position in which a handle 74a occupies a position covering the leg 64, and the other is an instrument guarding position to which the guard is pivoted downwardly and in which the handle occupies the broken line position shown by the broken lines 74b. The guard 70 has a padlock lug, not shown, by which it is padlocked in the pivoted position, and the body of the guard 70 in that position blocks off the instrument panel 38 from outside access thereto. The guard 70 is returned to the unpivoted or unused position by the handle 74 and is retained in that position by a coil tension overcenter spring, not shown.

The tower section 48 of each side plate carries the pivot connection for the lift cylinder at that side, comprising a bracket 76 on each plate and a closely spaced apart ferrule 78 having an opening aligned with a pivot pin opening in the bracket 76. The section 48 and rear extension 52 cooperatively carry a tractor body fender 80 disposed parallel to the horizontal plane containing the front and rear gage bars 14 and 16.

GAGE BARS—FIGS. 4 and 5

At the bottom edge of the respective tower section 48 and rear extension 52 of the two side plates 30 and 32, clamping joints are provided interconnecting the side plates and the gage bars at longitudinally and transversely spaced apart independent points separate from and intermediate the track frame at each side of the body and the main frame at that side. Each joint includes a bearing-like downfacing clamping block 82 welded directly to the adjacent bottom edge of the leg of the A-frame, and a depending bearing-like cap 84 completing the joint and detachably carried on the clamping block 82 by means of a set of hold-down cap bolts 86.

Each of the gage bars 14 and 16 has an unfinished generally cylindrical outside surface uniform in cross section from end to end of the bar, whereas the confronting upper and lower clamping surfaces of the respective block 82 and depending cap 84 have non-circularity because their generally semicylindrical surfaces include barely perceptible inner, circumferentially spaced apart flats 88. A tight grip against turning and sliding is insured in this way. As a consequence, the tractor body on the assembly line is precisely aligned in an initial disposition relative to the longitudinal axis of the overall tractor, and the A-frame 28 is thereafter fixedly clamped to whatever confronting points register therewith on the front and rear gage bars 14 and 16 to make the aligned disposition permanent.

A suitable cradle or pad 90 (FIG. 5) on the bar 14 provides support for the main frame at the forward end, the bar 14 being a one-piece member. The rear bar 16 is actually a two-piece member, provided with mounting flanges 92 at the inner end of each piece for attaching same by studs and nuts to the rear sides of the main frame.

A-FRAME MODIFIED—FIGS. 6 and 7

The modification for the tractor 10b of FIGS. 6 and 7 consists of a double wall A-frame 128 for loader work which utilizes the same basic A-frame 28, but with the height slightly added to, with the strength added to, and with the number of linkage mounting points increased. More specifically, a post structure 130 (FIG. 6) applied at each side to the side plate of the basic A-frame 28 comprises a vertical transversely disposed rear wall 132 and a vertical longitudinally disposed side wall 134.

The side wall 134 forms the outer wall of the resulting double wall and has a downwardly and forwardly extending front edge 136 which parallels the front edge of the side plate, the side plate forming the inner wall. At the top, the vertical walls 132 and 134 provide a tower 138 which, when the post structure 130 occupies the installed position shown by the broken lines 130a in FIG. 6, rises slightly above the side wall of the basic A-frame 28.

The double wall in the vicinity of the tower 138 carries a casting 140 welded on the outside thereto, the tower and casting providing the holes for receiving a boom pivot having an axis 142 and the casting itself carrying an appropriate pivet and a so-called tilt or bucket cylinder 144 for manipulating the loader bucket.

Registering eyes 146 and 148 at locations halfway down the double walls define a lift cylinder pivot axis 150 for a loader lift cylinder, not shown, which pivots on a pivot between the eyes.

A downwardly and forwardly extending cross reinforcement plate 151 between the double walls of each set at the forward edge of the A-frame 128 provides stiffness against the loading. The respective lift cylinder pivot, boom pivot, and bucket cylinder and pivot referred to all form part of a power loader linkage mounted to the post structures 130.

The various details of the basic A-frame 28 will not be repeated. Two previously undisclosed forwardly extending brackets 154 can be seen on the long leg 62 of the upper crossmember 34 in a horizontally disposed position shaped to conform to and underlying the rear upper edge of the hood, not shown, for location and support purposes.

The clamping joints for the legs of the A-frame 128 are disposed below the walls 134 forming the outer ones of the double walls. Hence, the bearing-like clamping blocks 152 included in the joints are welded directly to the bottom edges of the walls 134. Although blocks can also be provided under the inner walls, they usually are not.

In order to positively insure against lateral movement of the body relative to the gage bars, particularly the front bar where the lateral displacing forces are greatest, a ring-shaped stop 156 (FIG. 5) can be welded to the front bar 14 on each end portion thereof so as to be fairly close to the adjacent block 82 when the A-frame is in its final position. Controlling the width of the individual ring stops 156 will enable the same stop to be external to the block 82 in the embodiment of FIG. 5 and internal or medial to the block 152 of FIG. 7, so that both embodiments use identical front gage bars.

But irrespective of the provision of a stop or not, the gage bars receive whichever A-frame is selected, because each bar can accept a block 82 or 152 at any point along its length spaced apart from and between the main frame and the track frame at each side of the crawler. The blocks 82 and 152 are essentially the same in construction, each detachably carrying a depending bearing cap.

From the foregoing, it is seen that our invention provides a process for readily manufacturing tractor vehicles for different work in the field which comprises: constructing identical crawler bodies except with respect to the height and strength of the implement linkage mounting frames to be in said bodies; constructing for the bodies, implement linkage mounting, A-frames of a type with two single wall A-frame legs for one work and implement linkage mounting, A-frames of a differing type with essentially the same basic frame but with taller and two double wall A-frame legs for a differing work; constructing power dozer blades and dozer linkages for certain ones of said bodies for dozer work; constructing power loader buckets and loader linkages for certain others of said bodies for loader work; assembling said vehicles for dozer work with A-frames of the single wall type and with said certain ones of said bodies and with said dozer blades and dozer linkages; and assembling said vehicles for loader work with A-frames of the double wall type and with said certain others of said bodies and with said loader buckets and loader linkages.

The foregoing process of assembly up to the included step of installing the dozer linkage or the loader linkage as the case may be entails, as the only principal consideration in respect of additional or different parts needed, whether or not to provide and add side posts to the frame legs. According to our invention, we thus provide in the final tractor certain ones of the A-frames with the basic A-frame with side posts welded integrally thereto to double the leg walls of each of the legs, and certain others of the A-frames with the same basic A-frame without side posts.

Variations within the spirit and scope of the invention described are equally comprehended by the foregoing description.

What is claimed is:

1. A process of manufacturing first and second tractor vehicles for different work in the field, which comprises:
    constructing identical tractor bodies except with respect to the height and strength of the implement linkage mounting frames to be in said bodies;
    constructing for the bodies implement linkage mounting, A-frames of a type with single wall A-frame legs for one work and implement linkage mounting, A-frames of a differing type with essentially the same basic frame but with taller and double wall A-frame legs for a differing work;
    constructing power dozer blades and dozer linkages for certain ones of said bodies for dozer work;
    constructing power loader buckets and loader linkages for certain others of said bodies for loader work;
    assembling said first vehicles for dozer work with A-frames of one type and with said certain ones of said bodies and with said dozer blades and dozer linkages; and
    assembling said second vehicles for loader work with A-frames of a differing type and with said certain others of said bodies and with said loader buckets and loader linkages.

* * * * *